(12) United States Patent
Kobayashi

(10) Patent No.: US 8,159,747 B2
(45) Date of Patent: Apr. 17, 2012

(54) DIFFRACTIVE OPTICAL ELEMENT AND OPTICAL SYSTEM INCLUDING THE SAME

(75) Inventor: Mikio Kobayashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/327,518

(22) Filed: Dec. 3, 2008

(65) Prior Publication Data

US 2009/0141354 A1   Jun. 4, 2009

(30) Foreign Application Priority Data

Dec. 3, 2007 (JP) ................................. 2007-312144

(51) Int. Cl.
*G02B 5/18* (2006.01)

(52) U.S. Cl. ....................................................... 359/576

(58) Field of Classification Search .................. 359/566, 359/569, 571, 576
See application file for complete search history.

(56) References Cited

U.S. PATENT DOCUMENTS

| 5,044,706 A | 9/1991 | Chen |
| 7,864,425 B2 * | 1/2011 | Okada et al. ................... 359/569 |

| 2001/0015848 A1 | 8/2001 | Nakai |
| 2003/0231396 A1 | 12/2003 | Nakai |
| 2004/0104379 A1 | 6/2004 | Ukuda |
| 2004/0263982 A1 | 12/2004 | Ishii |

FOREIGN PATENT DOCUMENTS

| JP | 2005-001319 A | 1/2005 |
| JP | 2006-220689 A | 8/2006 |
| JP | 2006-220816 A | 8/2006 |
| JP | 2006-235007 A | 9/2006 |

OTHER PUBLICATIONS

SPIE vol. 1354 International Lens Design Conference(1990), including: D. Malacara, Diffraction Performance Calculations in Lens Design, pp. 2-14; M. Farn and J. Goodman, Diffractive doublet corrected on-axis at two wavelengths, pp. 24-29; and C. Londono and P. Clark, The design of achromatized hybrid diffractive lens systems, pp. 30-37.

* cited by examiner

*Primary Examiner* — Alessandro Amari

(74) *Attorney, Agent, or Firm* — Canon USA, Inc., I.P. Division

(57) ABSTRACT

A diffractive optical element includes at least one element portion including a base, a diffraction grating, a substrate, and an intermediate layer. The base and the diffraction grating are disposed above the substrate through the intermediate layer, and are formed of a same material. An extinction coefficient for the d-line of the material of the diffraction grating and an extinction coefficient for the d-line of a material of the intermediate layer are properly set to satisfied conditional expressions.

13 Claims, 15 Drawing Sheets

DIFFRACTIVE OPTICAL ELEMENT AND OPTICAL SYSTEM INCLUDING THE SAME

BACKGROUND OF THE INVENTION

1. Field of the Invention

The present invention relates to a diffractive optical element which can have a high diffraction efficiency in a visible wavelength region, and which is suitable for use in an optical apparatus, such as a video camera or a digital camera.

2. Description of the Related Art

As a method of reducing chromatic aberration of an optical system, a method of combining different lens materials is known. In addition, a method using a diffractive optical element in an optical system is known. Refer to SPIE Vol. 1354 International Lens Design Conference (1990), and to U.S. Pat. No. 5,044,706.

A diffractive optical element not only can correct chromatic aberration, but also can provide an aspherical effect as a result of appropriately changing a period of a periodic structure.

In an optical system including a diffractive optical element, when a light beam in a usable wavelength range is mostly diffracted light of a particular order (design order), the intensity of diffracted light of orders other than the particular order is reduced.

Diffracted light of orders other than the design order propagates in a direction differing from that of design-order light and thereby becomes flares.

Therefore, when a diffractive optical element is to be used in an optical system, the diffraction efficiency of the design-order diffracted light needs to be sufficiently high over the entire usable wavelength range.

FIG. 15 is a sectional view of the main portion of a known diffractive optical element (single-layer DOE) comprising a substrate 302 and a diffraction grating 301 formed on the substrate 302.

FIG. 16 is a graph showing diffraction efficiency with respect to particular orders of the single-layer DOE of FIG. 15.

In FIG. 16, the horizontal axis represents the wavelength of incident light, and the vertical axis represents the diffraction efficiency. The diffraction efficiency refers to the ratio of the quantity of diffracted light for each order with respect to the quantity of transmitted light. However, reflected light at a boundary surface of the grating is not considered.

As shown in FIG. 16, the single-layer DOE shown in FIG. 15 is designed so that the diffraction efficiency of first-order diffracted light is highest. That is, the design order corresponds to the first order.

The diffraction efficiency of the first-order diffracted light is highest at a certain wavelength (corresponding to a design wavelength), and gradually decreases at other wavelengths.

The diffraction efficiency for the design order is low, thereby producing zeroth-order and second-order diffracted light. This produces flares in an optical system.

A structure that reduces such flares is known. Refer to US Nos. 2004/0263982, 2001/0015848, 2004/0104379, and 2003/0231396, and Japanese Patent Laid-Open Nos. 2006-220689, 2005-1319, 2006-220816, and 2006-235007.

FIG. 17 is a sectional view of the main portion of a diffractive optical element according to US No. 2004/0263982.

In the diffractive optical element shown in FIG. 17, grating portions having two different grating thicknesses d1 and d2 and three different types of grating materials 306 to 308 are optimally selected, and a plurality of diffraction gratings are disposed in contact with each other at an equal pitch distribution.

Accordingly, as shown in FIG. 18, a high diffraction efficiency is provided for the design order over the entire visible range.

FIG. 19 is a sectional view of the main portion of a diffractive optical element according to US No. 2001/0015848.

The diffractive optical element shown in FIG. 19 has a structure (stacked DOE 201) in which element portions 202 and 203, each including a diffraction grating, are disposed close to each other with an air layer 210 being disposed therebetween. By optimizing, for example, the thicknesses of the grating portions of the respective layers, dispersion characteristics (Abbe number νd), and refractive indices of the materials of the respective diffraction gratings, a high diffraction efficiency is provided for the design order over the entire visible range as shown in FIG. 20.

In diffractive optical elements according to US Nos. 2004/0104379 and 2003/0231396, ITO fine particles, etc., are used in materials of diffraction gratings to properly set dispersions and refractive indices of the materials. Accordingly, diffractive optical elements having little flare even in various image-forming conditions while providing a high diffraction efficiency are realized.

In general, materials using ITO fine particles easily provide a high diffraction efficiency. However, as discussed in Japanese Patent Laid-Open Nos. 2006-220689, transmittance tends to be reduced due to coloration of the ITO fine particles. In addition, it is difficult for the fine particles to have dispersibility, and light scattering tends to increase.

According to Japanese Patent Laid-Open No. 2006-220689, a diffractive optical element having a high transmittance while having a high diffraction efficiency is obtained as a result of properly setting an optical material of a diffraction grating.

When producing a diffractive optical element using a material in which transparency of ITO fine particles, etc., is low and in which light scattering tends to occur, it is possible to improve transmittance and reduce light scattering if, for example, the thickness of an optical layer comprising a base and a grating portion of a diffraction grating is reduced.

However, when the thickness of the optical layer is reduced, a wall thickness ratio of the optical layer is increased. Therefore, for example, peeling, cracking, and distortion during molding tend to occur. Further, stability with respect to environmental changes after manufacturing tends to be reduced.

Japanese Patent Laid-Open Nos. 2005-1319 and 2006-220816 each propose a molding method that can increase the stability during molding by concentrating changes in shape at a free surface that does not contact a mold.

Japanese Patent Laid-Open No. 2006-235007 proposes a molding method using an intermediate layer disposed between an optical layer and a substrate and formed of a material differing from that of the optical layer.

In general, when a diffraction grating is formed on a substrate, a grating base (formed of a material that is the same as that of a grating portion) is provided between the diffraction grating and the substrate. In addition, the thickness of the grating base is increased to reduce a wall thickness ratio of the grating portion, so that, for example, distortion during molding is prevented from occurring.

When ITO fine particles are used in the material of the diffraction grating, a high diffraction efficiency is easily obtained, and it is easier to properly set dispersion.

Since ITO fine particles have high absorption and cause high light scattering, the grating base must be made as thin as possible. However, when the grating base is made thin, the wall thickness ratio is increased. Therefore, the shape stability during and after molding is reduced.

For shape stability, an intermediate layer may be provided between the substrate and the diffraction grating. However, when a plurality of layers are formed on the substrate using two or more types of materials, differences between the refractive indices of the materials and the state of an interface greatly influence the diffraction efficiency. When the difference between the refractive indices of the materials is large, scattering at the interface becomes large. In addition, when the interface is not flat, a wave surface is distorted, thereby reducing the diffraction efficiency.

SUMMARY OF THE INVENTION

The present invention provides a diffractive optical element having a high diffraction efficiency, a high transmittance, and shape stability during and after molding. The present invention further provides an optical system using the diffractive optical element.

According to an aspect of the present invention, there is provided a diffractive optical element comprising at least one element portion including a base, a diffraction grating, a substrate, and an intermediate layer. The base and the diffraction grating are disposed above the substrate through the intermediate layer. The base and the diffraction grating are formed of a same material. In the diffractive optical element, the following conditional expressions are satisfied:

$$3.0\times10^{-4} < Ka < 1.0\times10^{-3} \quad (1a), \text{ and}$$

$$Kb < 3.0\times10^{-4} \quad (1b)$$

where Ka and Kb are an extinction coefficient for the d-line of the material of the diffraction grating and an extinction coefficient for the d-line of a material of the intermediate layer respectively.

Further features of the present invention will become apparent from the following description of exemplary embodiments with reference to the attached drawings.

DESCRIPTION OF THE EMBODIMENTS

A diffractive optical element according to the present invention comprises at least one element portion having a base and a diffraction grating formed above a substrate through an intermediate layer. The substrate is formed of a lens or a transparent flat plate.

Here, the base and the diffraction grating are formed of the same material.

The diffraction grating and the intermediate layer are formed of materials having different extinction coefficients.

First Embodiment

Figure 1:
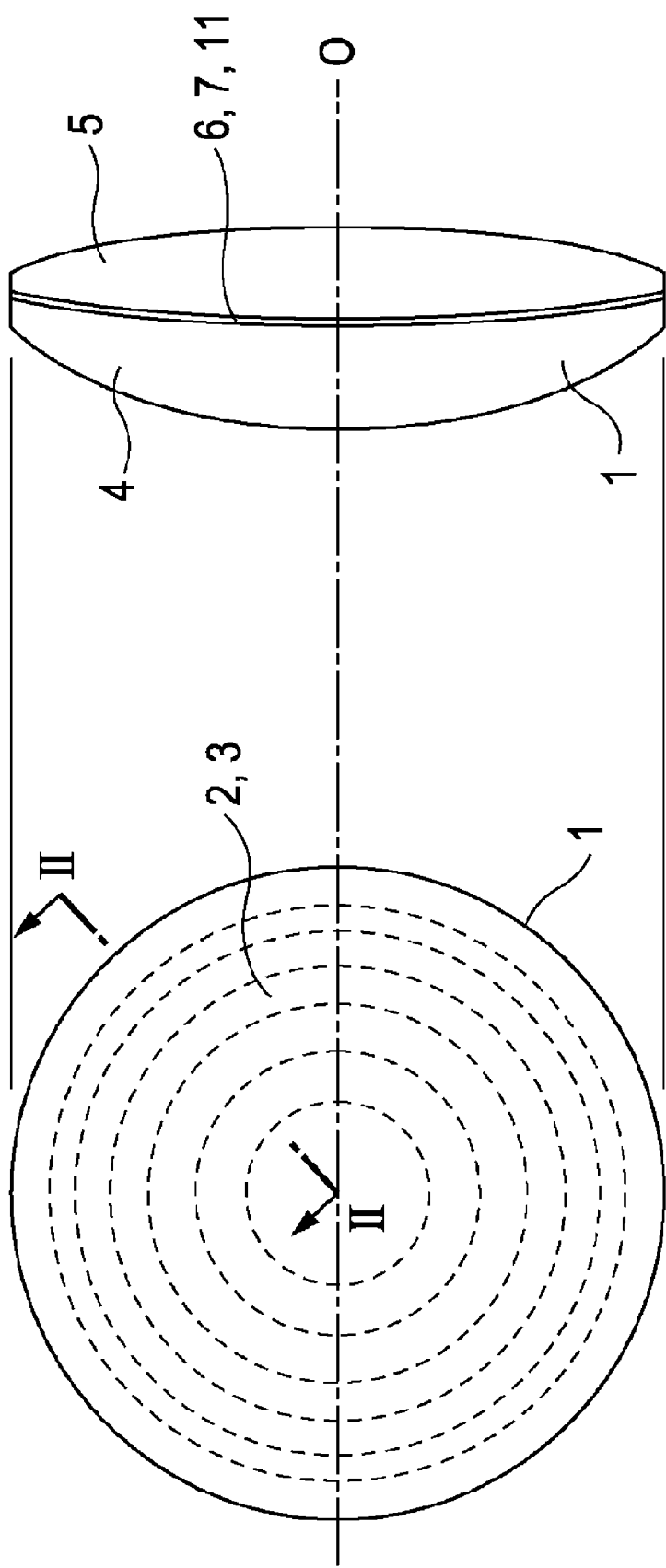
FIGS. 1A and 1B are a front view and a side view of a diffractive optical element according to a first embodiment of the present invention.
Figure 2:
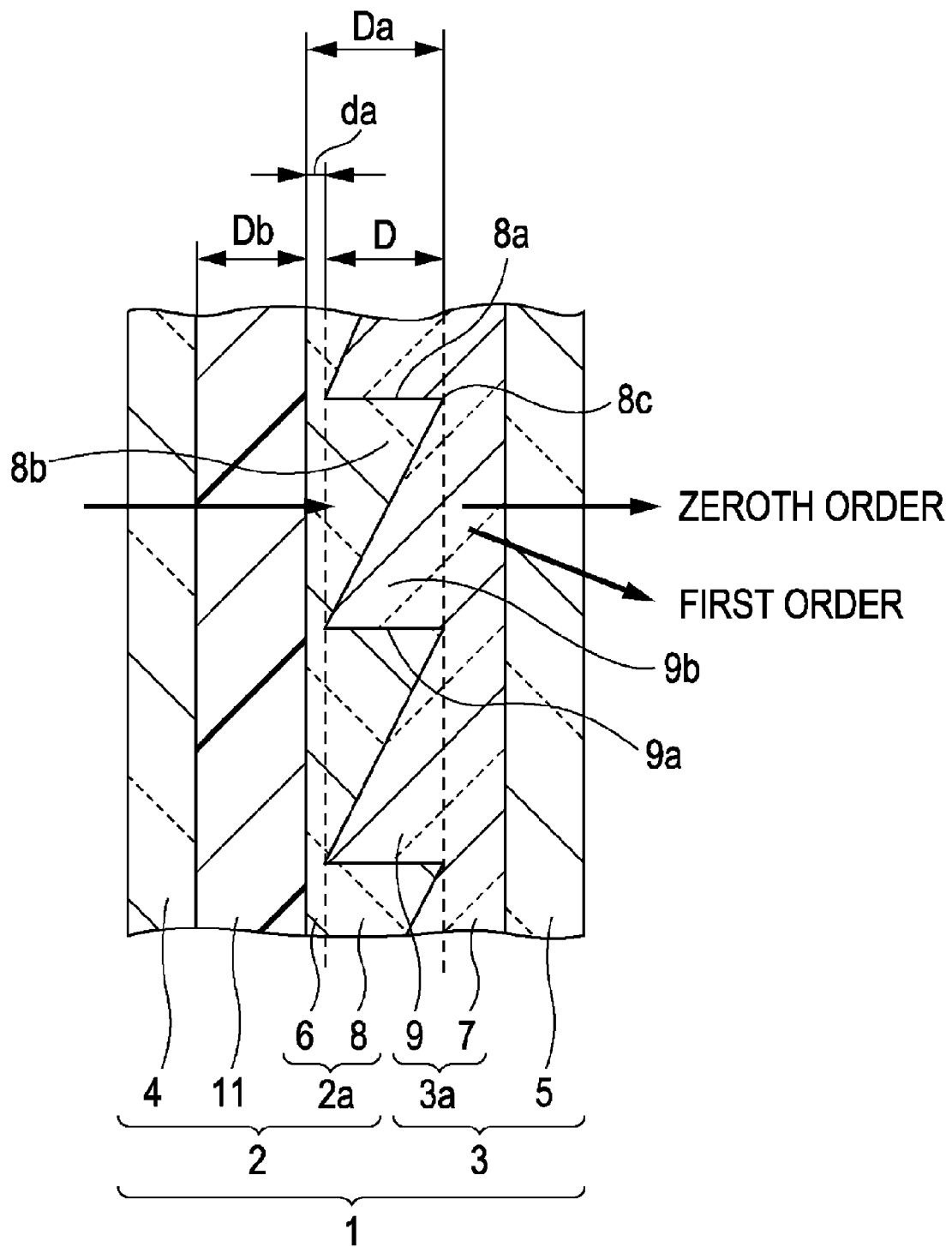
FIG. 2 is a partial sectional view of the diffractive optical element according to the first embodiment.

FIG. 1A is a front view of a diffractive optical element according to a first embodiment of the present invention. FIG. 1B is a side view of the diffractive optical element according to the first embodiment. FIG. 2 is a sectional view of the diffractive optical element shown in FIG. 1 taken along line II-II of FIG. 1.

In FIG. 2, a grating portion of a diffraction grating is shown as being deformed in a grating depth direction.

A diffractive optical element 1 comprises a first element portion 2 and a second element portion 3.

The first element portion 2 comprises a first transparent substrate 4, a first grating formation layer 2a, and an intermediate layer (material layer) 11. The first grating formation layer 2a comprises a grating base 6 and a first diffraction grating 8. The intermediate layer 11 is provided between the substrate 4 and the grating base 6.

The second element portion 3 comprises a second transparent substrate 5 and a second grating formation layer 3a. The second grating formation layer 3a comprises a grating base 7 and a second diffraction grating 9.

A grating surface 8a of a grating portion 8b of the first diffraction grating 8 and a grating surface 9a of a grating portion 9b of the second diffraction grating 9 are adhered to each other.

The first element portion 2 and the second element portion 3 as a whole function as one diffractive optical element 1.

The first diffraction grating 8 and the second diffraction grating 9 have concentric grating shapes and cause light to be converged as a result of changing a grating pitch in a radial direction.

A wavelength range of light that is incident upon the diffractive optical element 1, (that is, a usable wavelength range), corresponds to a visible range (wavelengths of from 400 nm to 700 nm). The materials and the thicknesses of the grating portions 8b and 9b of the respective first and second diffraction gratings 8 and 9 are selected so that diffraction efficiency of a first-order diffracted light is high over the entire visible range.

Next, the diffraction efficiency of the diffractive optical element 1 according to the embodiment will be described.

Figure 15:
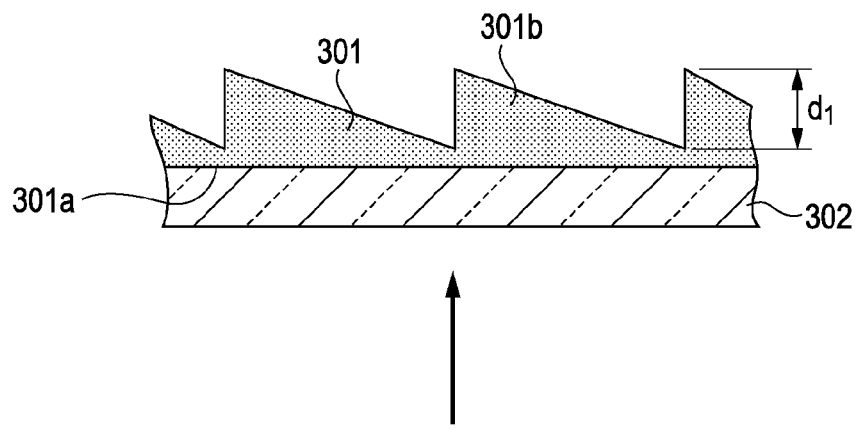
FIG. 15 is a partial sectional view of a known single-layer diffractive optical element.
Figure 16:
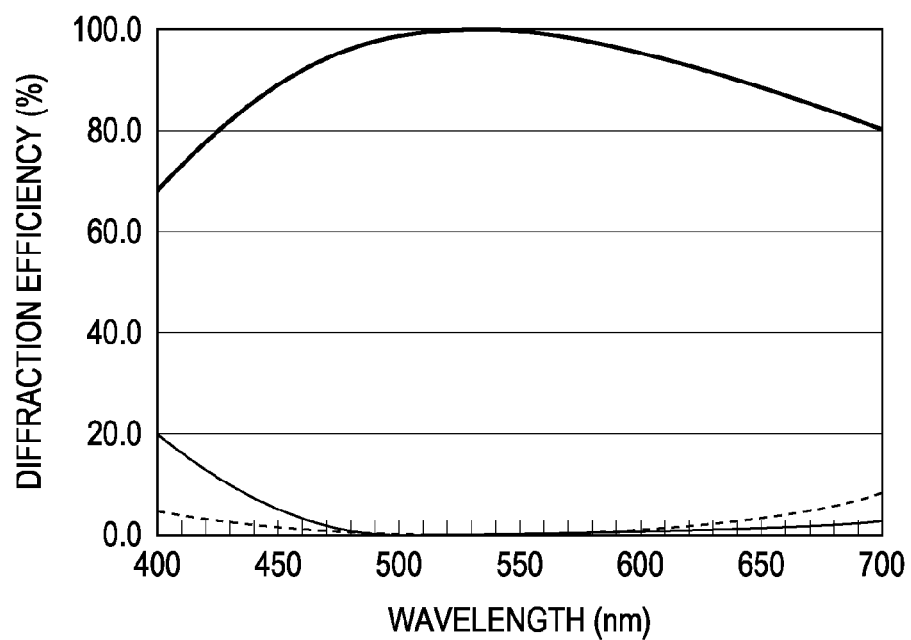
FIG. 16 is a characteristic graph showing diffraction efficiency for a design order of the single-layer diffractive optical element of FIG. 15.
Figure 17:
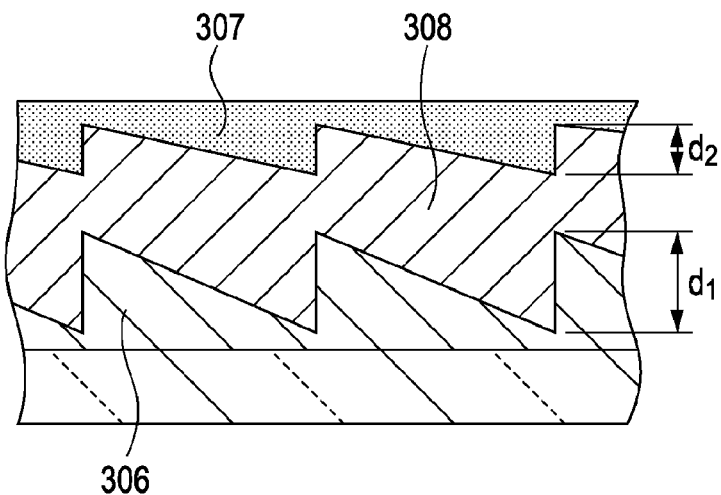
FIG. 17 is a partial sectional view of a known stacked diffractive optical element.
Figure 18:
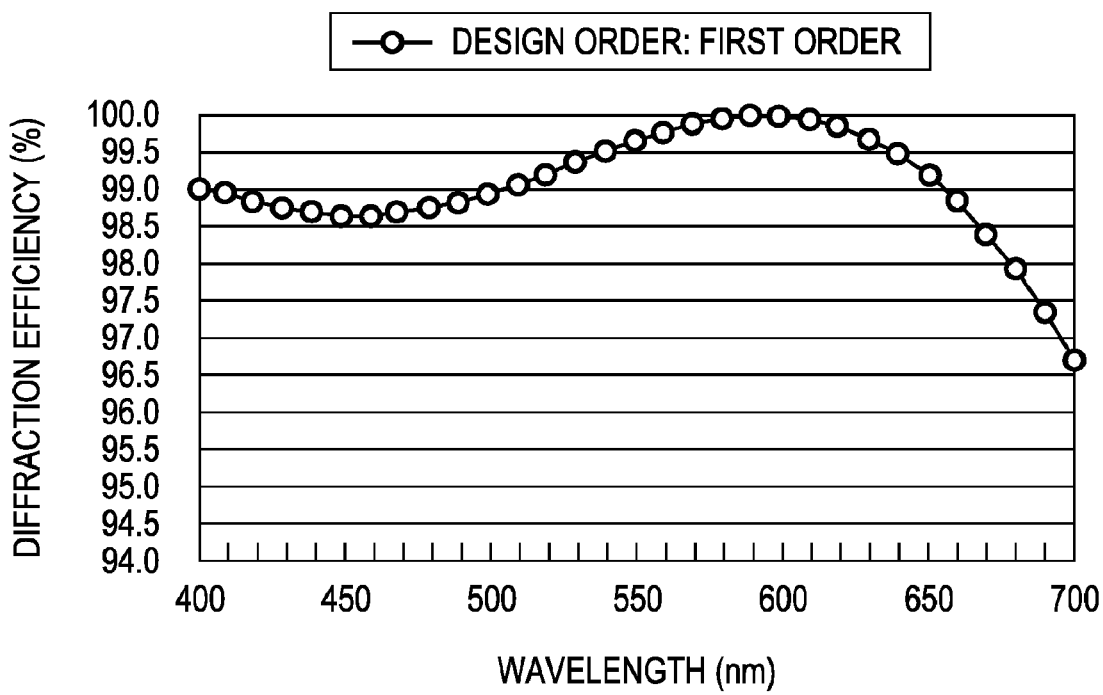
FIG. 18 is a characteristic graph showing diffraction efficiency for a design order of the stacked diffractive optical element of FIG. 17.
Figure 19:
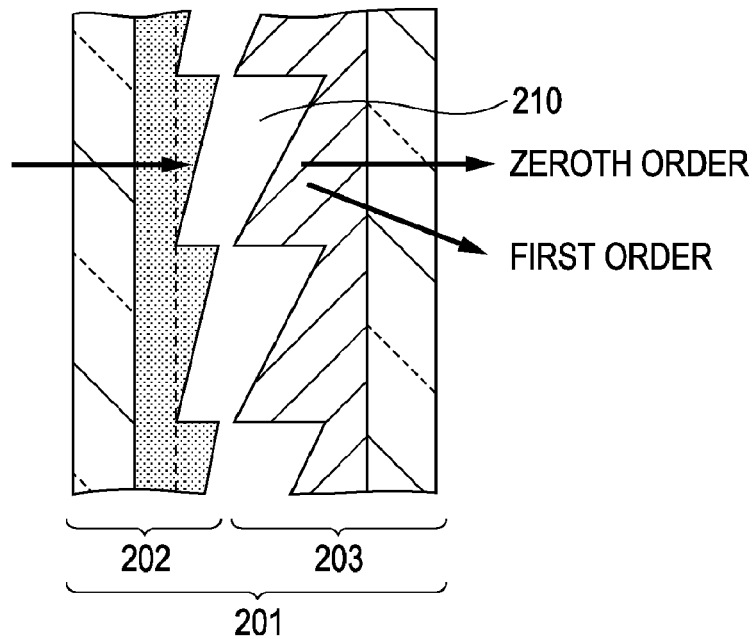
FIG. 19 is a partial sectional view of a known stacked diffractive optical element.

A condition in which the diffraction efficiency of diffracted light of a certain order is a maximum when a design wavelength is $\lambda_0$ in the single-layer DOE (diffractive optical element) shown in FIG. 15 will be considered.

A case in which a light beam is perpendicularly incident upon a base surface 301a of the diffraction grating 301 (corresponding to the surface that is indicated by dotted lines in FIG. 2) will be described.

Here, the difference between the optical paths at the crest and the trough of a grating portion 301b of the diffraction grating 301 (that is, the difference between the optical paths of a light beam passing the crest and the trough respectively) is an integral multiple of the wavelength.

This is expressed as follows:

$$(n_0-1)d = m\lambda_0 \quad (a)$$

Here, $n_0$ represents the refractive index of the material of the grating portion 301b with respect to light having a wavelength $\lambda_0$, d represents the grating thickness of the grating portion 301b, and m represents the diffraction order.

Since Conditional Expression (a) includes the wavelength $\lambda_0$, the equality holds true only at a design wavelength for the same order. Therefore, the maximum value of the diffraction efficiency of wavelengths other than the design wavelength is reduced.

Diffraction efficiency $\eta(\lambda)$ at any wavelength $\lambda$ can be expressed as follows:

$$\eta(\lambda) = \sin c^2 [\Pi\{M - (n_1(\lambda)-1)d/\lambda\}] \quad (5)$$

In Conditional Expression (5), M represents the order of diffracted light to be evaluated, $n_1(\lambda)$ represents the refractive index of the material of the grating portion with respect to light having a wavelength $\lambda$, and $\sin c^2 (x)$ represents a function represented by $\{\sin(x)/x\}^2$.

This also applies to a diffractive optical element in which two or more diffraction gratings are stacked as in the embodiment.

That is, the difference between the optical path lengths at the crest and trough of the grating portion is determined from the grating height and material (including air, etc.) of the grating portion of each diffraction grating. The shape of each grating portion is determined so that the sum of the differences between the optical paths of all of the diffraction gratings is an integral multiple of the wavelength.

Therefore, in the diffractive optical element 1 shown in FIG. 1, the condition in which the diffraction efficiency of diffracted light of the diffraction order m is a maximum when the design wavelength is $\lambda_0$ is expressed as follows:

$$\pm(n_{01}-n_{02})d1 = m\lambda_0 \quad (6)$$

Here, $n_{01}$ represents the refractive index at the wavelength $\lambda_0$ of the grating portion 8b of the first diffraction grating 8, $n_{02}$ represents the refractive index at the wavelength $\lambda_0$ of the grating portion 9b of the second diffraction grating 9, and $d_1$ represents the grating thickness of each of the grating portion 8b and grating portion 9b.

In FIG. 2, the diffraction order of light that is diffracted downward from zeroth-order light is positive whereas the diffraction order of light that is diffracted upward from the zeroth-order light is negative.

The sign in Conditional Expression (6) becomes negative when the diffraction grating is one having a grating shape in which the grating thickness of the grating portion increases from an upper side to a lower side in FIG. 2 (that is, the diffraction grating 9 in FIG. 2).

In the embodiment, the extinction coefficients for the d-line of the diffraction grating 8 and for the d-line of the intermediate layer 11 are represented by Ka and Kb, respectively. Here, as mentioned above, the diffraction grating 8 (base 6) and the intermediate layer 11 are formed of materials that satisfy the following Conditional Expressions (1a) and (1b):

$$3.0 \times 10^{-4} < Ka < 1.0 \times 10^{-3} \quad (1a), \text{ and}$$

$$Kb < 3.0 \times 10^{-4} \quad (1b)$$

The diffraction grating 8 is formed of a material in which ITO fine particles are mixed with ultraviolet curable resin.

More specifically, the base 6 and the grating portion 8b of the first diffraction grating 8 are formed of materials (Nd=1.432, vd=16.8) in which ITO fine particles are mixed with fluorocarbon resin Cytop (manufactured by Asahi Glass Co., Ltd.) (Nd=1.34, vd=94) at a volume ratio of 17%.

A thickness da of the base 6 of the first diffraction grating 8 is 3 μm.

The intermediate layer (material layer) 11, provided between the first diffraction grating 8 and the substrate 4, is formed of a material including ultraviolet curable resin (Nd=1.522, vd=51.3). The ultraviolet curable resin (Nd=1.522, vd=51.3) is manufactured by Dainippon Ink & Chemicals, Inc. The thickness of the intermediate layer is 10 μm.

The grating portion 9b of the second diffraction grating 9 is formed of polymethyl methacrylate (PMMA, Nd=1.492, vd=57.4).

The grating thickness of the grating portion 8b of the first diffraction grating 8 and the grating thickness of the grating portion 9b of the second diffraction grating 9 are each 10.05 μm.

In the structure according to the embodiment, a difference between the optical path lengths (phase difference) occurs at the diffraction gratings 8 and 9.

Figure 3:
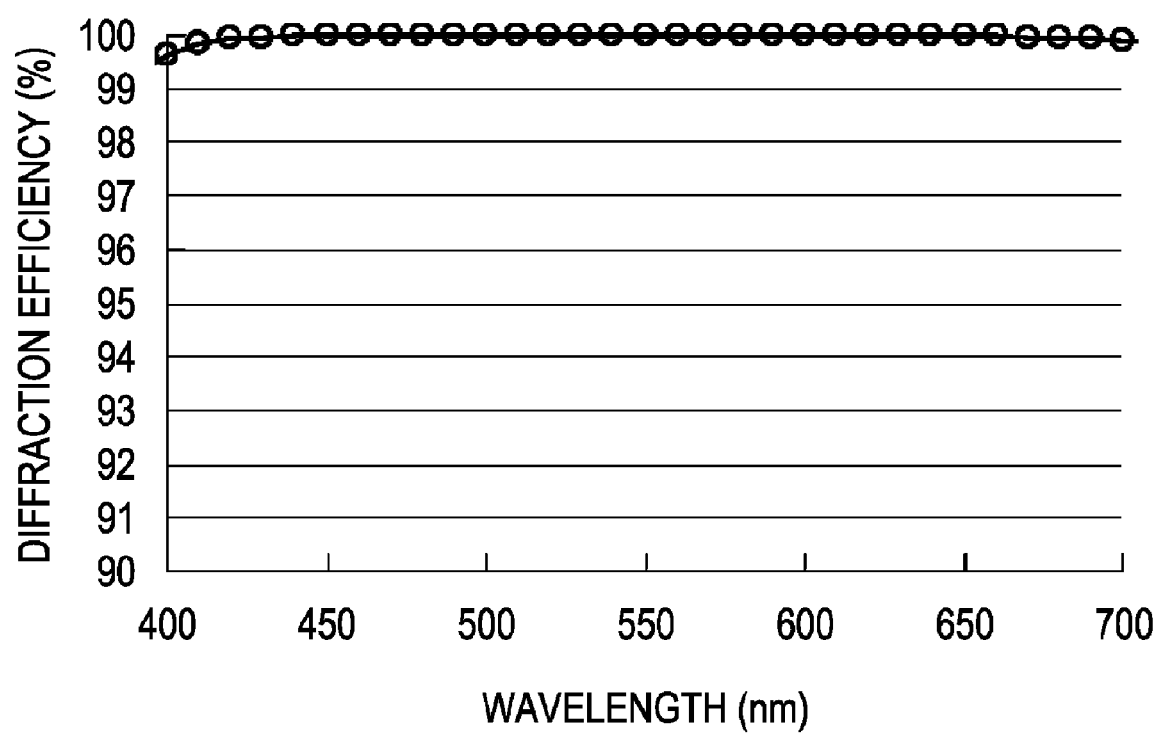
FIG. 3 is a characteristic diagram of diffraction efficiency for a design order of the diffractive optical element according to the first embodiment.
Figure 20:
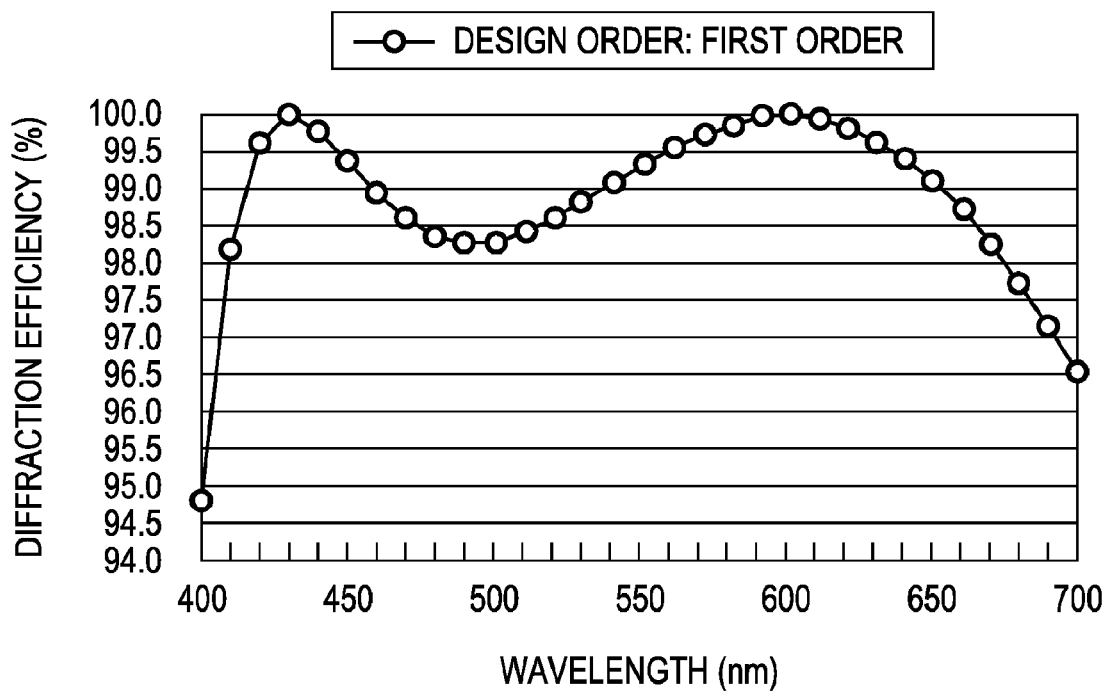
FIG. 20 is a characteristic graph showing diffraction efficiency for a design order of the stacked diffractive optical element of FIG. 19.

FIG. 3 is a graph showing diffraction efficiency for a design order (first order) of the diffraction optical element 1 according to the first embodiment. FIG. 3 shows that the diffraction efficiency is improved compared with that of the known stacked diffractive optical element shown in FIG. 20.

The diffraction efficiency of the diffractive optical element 1 according to the first embodiment is at least 99% over the entire visible range, so that diffracted light of orders other than the design order does not occur frequently.

Next, transmission characteristics of the diffraction optical element 1 according to the first embodiment will be described.

Indium tin oxide (ITO) has optical characteristics that cannot be provided by ordinary glass materials and resin materials. Using ITO in the diffraction grating 8 makes it possible to provide a high diffraction efficiency.

Further, dispersing ITO fine particles having diameters on the order of nanometers in a resin material that can be easily molded makes it possible to easily manufacture a diffraction grating using ITO.

Here, it is desirable that the size of a fine particle (average particle diameter) be less than or equal to $\frac{1}{20}$ of a usable wavelength (for example, 590 nm) so that light is not scattered by the ITO fine particles.

ITO has colorability. Therefore, when the volume ratio of ITO is made very high, or the thickness of the intermediate layer 11 (material layer) is increased, the transparency of the optical system is reduced.

When the volume ratio of ITO is reduced, it becomes difficult to obtain predetermined optical characteristics. In particular, it becomes difficult to obtain a high diffraction efficiency.

When the thickness of the base 6 is reduced, the wall thickness ratio of the grating portions is increased. Therefore, for example, distortion, sinking, and peeling tend to occur during molding. Consequently, in general, it is desirable that the thickness of the base 6 be greater than or equal to 10 μm.

The extinction coefficient for the d-line of the material of the diffraction grating 8 according to the first embodiment is $8.47 \times 10^{-4}$. When the base thickness of the base 6 is 10 μm, the transmittance of the diffractive optical element 1 is reduced to 75%.

Accordingly, in the first embodiment, the base thickness da of the base (material layer) is made low at 3 μm, and the intermediate layer 11 having a high transmittance is molded to a sufficient thickness of 10 μm between the base (material layer) 6 and the substrate 4. The extinction coefficient for the d-line of the material of the intermediate layer 11 is $7.35 \times 10^{-6}$.

In the embodiment, the thickness of the intermediate layer is Db (μm). Here, it is desirable that the following Conditional Expression (4) be satisfied:

$$10 (\mu m) \leq Db \qquad (4)$$

As a result, the sum of the thicknesses of the base 6 and the grating portion 8b of the diffraction grating 8 is 13 μm. Accordingly, a diffractive optical element that has excellent shape stability during molding and that is easy to manufacture can be provided, and a transmittance of over 85% is obtained.

In the embodiment, the maximum grating thickness of the grating portion 8b of the diffraction grating 8 is D (μm). The sum of the maximum grating thickness of the grating portion 8b and the maximum grating thickness of the base 6 is Da (μm). Here, the following Conditional Expression (3) is satisfied:

$$(Da - D) < 8 (\mu m) \qquad (3)$$

The extinction coefficient Ka of the material used in the diffraction grating 8 satisfies the aforementioned Conditional Expression (1a) at the wavelength (such as the d-line) of the light that is used.

Further, it is desirable that the material of the intermediate layer 11 be formed of a material having a high transparency. It is at least desirable that the material of the intermediate layer 11 be formed of a material whose transparency is higher than the material of the grating portion 8b of the diffraction grating 8.

For example, the extinction coefficient Kb of the material used in the intermediate layer 11 satisfies the aforementioned Conditional Expression (1b).

Although it is desirable for the extinction coefficient Kb to be small, the extinction coefficient Kb satisfies the following Conditional Expression:

$$1.0 \times 10^{-8} < Kb$$

Here, the extinction coefficient K represents the extent of internal absorption of the material. When light having a wavelength λ (μm) is incident upon the material having a thickness d (μm), the light quantity of the incident light is $I_0$, and the light quantity of the exiting light is I. In this case, the following Conditional Expression is satisfied:

$$I = I_0 \times e^{\left(\frac{K \times d \times 4 \times \pi}{\lambda}\right)}$$

When the extinction coefficient Ka becomes less than a lower limit of Conditional Expression (1a), the transparency of the material is increased. Therefore, for manufacturing reasons, it is advantageous to integrally form the intermediate layer 11 with the base layer 6 at the diffraction grating 8 using the same material.

When the extinction coefficient Ka becomes greater than an upper limit of Conditional Expression (1a), the transmittance of the diffraction grating is reduced by a large amount. Accordingly, even if the base layer 6 is made thin, it is difficult to maintain the transmittance of the entire diffractive optical element at a high value.

When the extinction coefficient Kb becomes greater than an upper limit of Conditional Expression (1b), the absorption is increased as a result of increasing the thickness of the intermediate layer 11. This is not desirable.

Although, in the first embodiment, ITO is used as a material having a low transparency, materials that can be used in the diffractive optical element according to the element is not limited to ITO.

As mentioned above, according to the embodiment, it is possible to provide a diffractive optical element having a high transmittance while preventing occurrence of, for example, distortion or sinking during molding and while providing a high diffraction efficiency due to the use of fine particles, such as ITO, in the grating portion of the diffraction grating.

Second Embodiment

Figure 4:
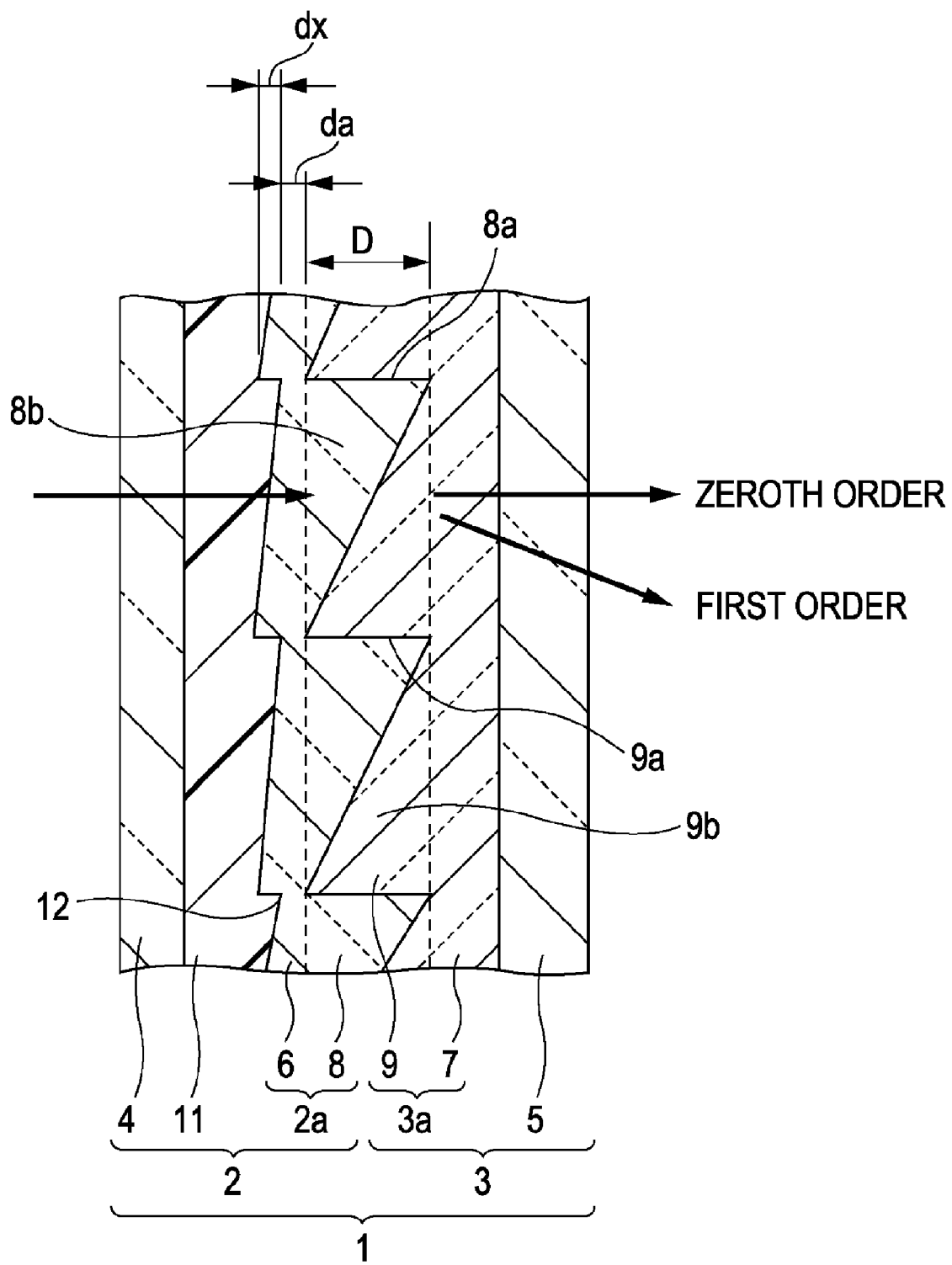
FIG. 4 is a partial sectional view of a diffractive optical element according to a second embodiment of the present invention.

FIG. 4 is a sectional view of the main portion of a diffractive optical element according to a second embodiment of the present invention.

A grating portion of a diffraction grating has a sawtooth form. An interface between an intermediate layer and a base has a sawtooth periodic structure having the same period as a grating period of the diffraction grating, and being formed of the same material as the intermediate layer.

A grating section of a periodic structure is oriented so that directions in which heights of the grating section and a grating portion 8b of a diffraction grating 8 are increased and decreased are the same.

A diffractive optical element 1 comprises a first element portion 2 and a second element portion 3.

The first element portion 2 comprises a first transparent substrate 4, a first grating formation layer 2a, and an intermediate layer (material layer) 11. The first grating formation layer 2a comprises a grating base 6 and a first diffraction grating 8. The intermediate layer 11 is provided between the substrate 4 and the grating base 6.

A sawtooth periodic structure 12 having the same period as the sawtooth form of a grating portion 8b of the diffraction grating 8 is formed at an interface between the grating base 6 and the intermediate layer 11.

The second element portion 3 comprises a second transparent substrate 5 and a second grating formation layer 3a. The second grating formation layer 3a comprises a grating base 7 and a second diffraction grating 9.

A grating surface 8a of a grating portion 8b of the first diffraction grating 8 and a grating surface 9a of a grating portion 9b of the second diffraction grating 9 are adhered to each other.

The first element portion 2 and the second element portion 3 as a whole function as one diffractive optical element 1.

The materials of the first diffraction grating 8, the second diffraction grating 9, and the intermediate layer are the same as those in the first embodiment.

The maximum height of the periodic structure 12 at the interface between the intermediate layer 11 and the grating base 6 is 0.5 μm.

The thickness of the base 6 of the first diffractive optical element 2 is 3 μm. The thickness of the intermediate layer 11 is 10 μm. The grating thicknesses of the diffraction gratings 8 and 9 are both 10.85 μm.

Figure 5A:
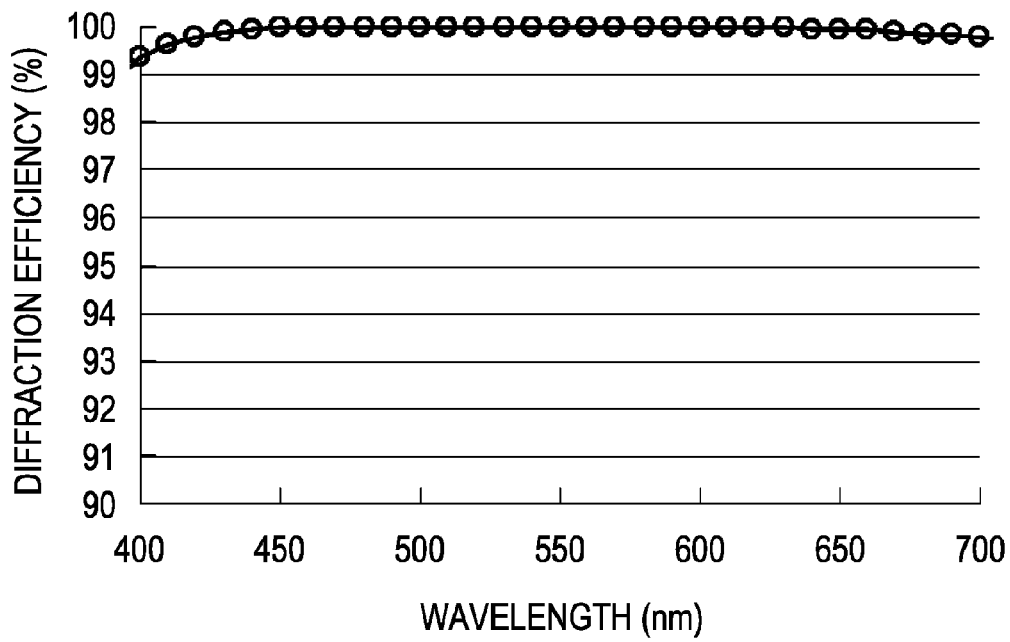
FIGS. 5A and 5B are characteristic diagrams of diffraction efficiencies for a design order of the diffractive optical element according to the second embodiment.

FIG. 5A shows diffraction efficiency of first-order diffracted light, which is a design-order light, of the diffractive optical element 1. According to the diffractive optical element 1, a high diffraction efficiency can be obtained over the entire visible range as in the first embodiment.

In the second embodiment, the sawtooth periodic structure 12 is provided at the interface between the intermediate layer 11 and the base 6. Since a phase difference occurs at this interface, the diffraction efficiency is reduced from a predetermined diffraction efficiency.

The periodic structure 12 is formed due to, for example, curing and contraction during molding of the diffraction grating 8. In particular, as the thickness of the base 6 at the diffraction grating 8 is reduced, the wall-thickness ratio of the material is increased. Therefore, the height of the periodic structure 12 tends to increase. Here, the periodic structure 12 may not be formed.

In the second embodiment, a height dx of the periodic structure 12 is 0.5 μm. Diffraction efficiency characteristics when the grating thickness of the grating portion 8b of the diffraction grating 8 is 10.05 μm are shown as a second comparative example in FIG. 5B.

Figure 5B:
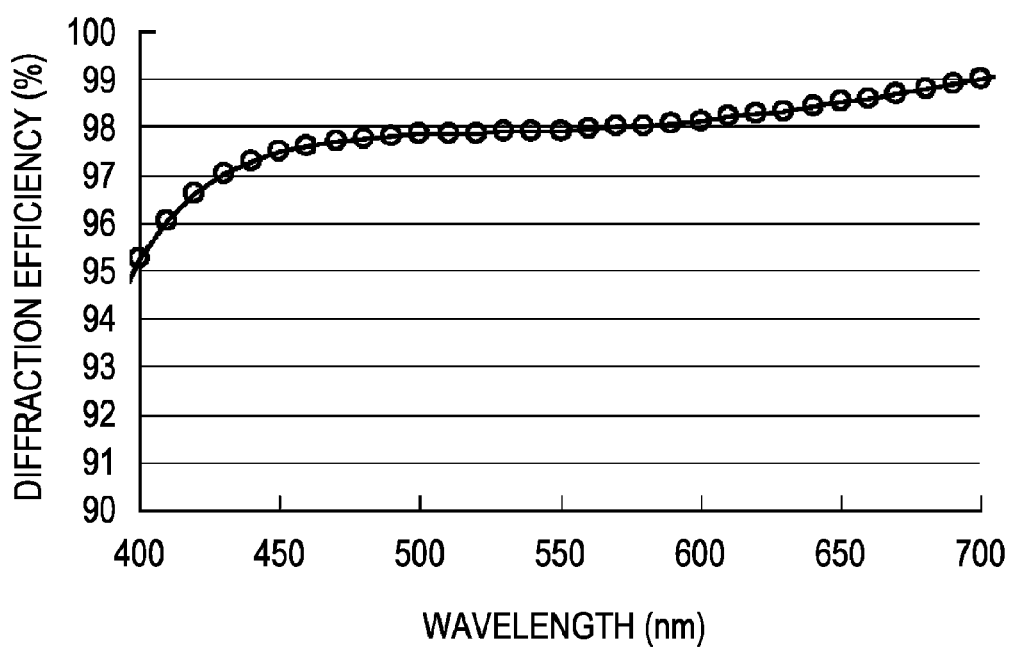

As shown in FIG. 5B, the diffraction efficiency is considerably reduced from a predetermined diffraction efficiency.

Accordingly, in the embodiment, when the periodic structure 12 is formed, the phase difference occurring due to the periodic structure 12 is corrected by the diffraction gratings 8 and 9.

The phase difference occurring due to the periodic structure 12 is determined by Conditional Expression (6) in the same way that the phase difference at the diffraction gratings 8 and 9 is determined.

This phase difference is corrected by changing the grating thicknesses of the grating portions 8b and 9b of the respective diffraction gratings 8 and 9 from 10.05 μm to 10.85 μm, so that high diffraction efficiency characteristics as those shown in FIG. 5A are obtained.

Here, the smaller the phase difference occurring due to the periodic structure 12, the smaller the amount of correction due to changing the grating thicknesses of the grating portions. Therefore, it is necessary to either reduce the maximum height dx of the periodic shape 12 or set the refractive indices of the materials of the intermediate layer 11 and the diffraction grating 8 close to each other.

Reducing the maximum height dx of the periodic structure 12 restricts the settings of the molding conditions of the diffraction grating. Therefore, the degree of design freedom is reduced. For setting the refractive index of the material of the intermediate layer 11 closer to the refractive index of the material of the grating portion 8b of the diffraction grating 8, the materials need to be selected as appropriate. Therefore, the degree of design freedom is reduced.

Consequently, it is necessary to properly balance the difference between the refractive indices and the height dx of the periodic structure 12. Here, the maximum grating height of the grating section of the periodic structure 12 within any period is dx (μm). The refractive indices at a wavelength $\mu_d$ (μm) of the d-line of a material A of the grating portion 8b, which is the same as the material of the diffraction grating 8, and the d-line of a material B of the intermediate layer 11 are Na and Nb, respectively. The difference between the refractive indices is $\Delta N_d$. Here, $$dx|Na-Nb|\lambda_d<0.2$$

That is, $$|dx \times \Delta N_d|/\lambda_d < 0.2 \qquad (2)$$

This increases the degree of design freedom of the diffractive optical element 1, and allows the diffractive optical element 1 to be produced by a stable molding method.

In the diffractive optical element 1 according to the second embodiment, the value on the left side of Conditional Expression (2) is 0.08, so that it has a structure that satisfies Conditional Expression (8).

Here, for combining the phase difference occurring at the diffraction gratings 8 and 9 and the phase difference occurring at the periodic shape 12, the thickness of the base 6, formed of the same material as the diffraction grating 8, is set at least less than or equal to 10 times a usable wavelength.

As the thickness of the base 6 is increased, diffraction phenomena occur separately at the diffraction grating 8 and at the periodic shape 12. Therefore, the phases are not combined, and flares of unnecessary orders are produced at the diffraction grating 8 and the periodic shape 12. This makes it difficult to achieve a high diffraction efficiency in the entire optical system.

Accordingly, it is desirable that the thickness of the base 6, formed of the same material as the diffraction grating 8, be at least less than or equal to 8 μm.

Further, in the second embodiment, when the difference between the refractive index of the material A of the grating portion 8b of the diffraction grating 8 and the refractive index of the material B of the intermediate layer 11 is selected as follows, it is possible to obtain a predetermined diffraction efficiency over the entire visible range:

$$0.4<|\Delta N_g/\Delta N_d|<1.5 \qquad (7a), \text{ and}$$

$$0.6<|\Delta N_C/\Delta N_d|<2.2 \qquad (7b)$$

Here, $\Delta N_g$ is the difference between the refractive indices for the g-line of the material A of the diffraction grating 8 (base 6) and for the g-line of the material B of the intermediate layer 11, $\Delta N_d$ is the difference between the refractive indices for the d-line of the material A of the diffraction grating 8 and for the d-line of the material B of the intermediate layer 11, and $\Delta N_C$ is the difference between the refractive indices for the C-line of the material A of the diffraction grating 8 and for the C-line of the material B of the intermediate layer 11.

In the second embodiment, the value in Conditional Expression (7a) is 0.8, and the value in Conditional Expression (7b) is 1.1.

Third Embodiment

In the third embodiment, a high diffraction efficiency is obtained over the entire visible range when the shape of a periodic structure 12 is not a sawtooth form depending upon the molding conditions of a diffraction grating.

Figure 6:
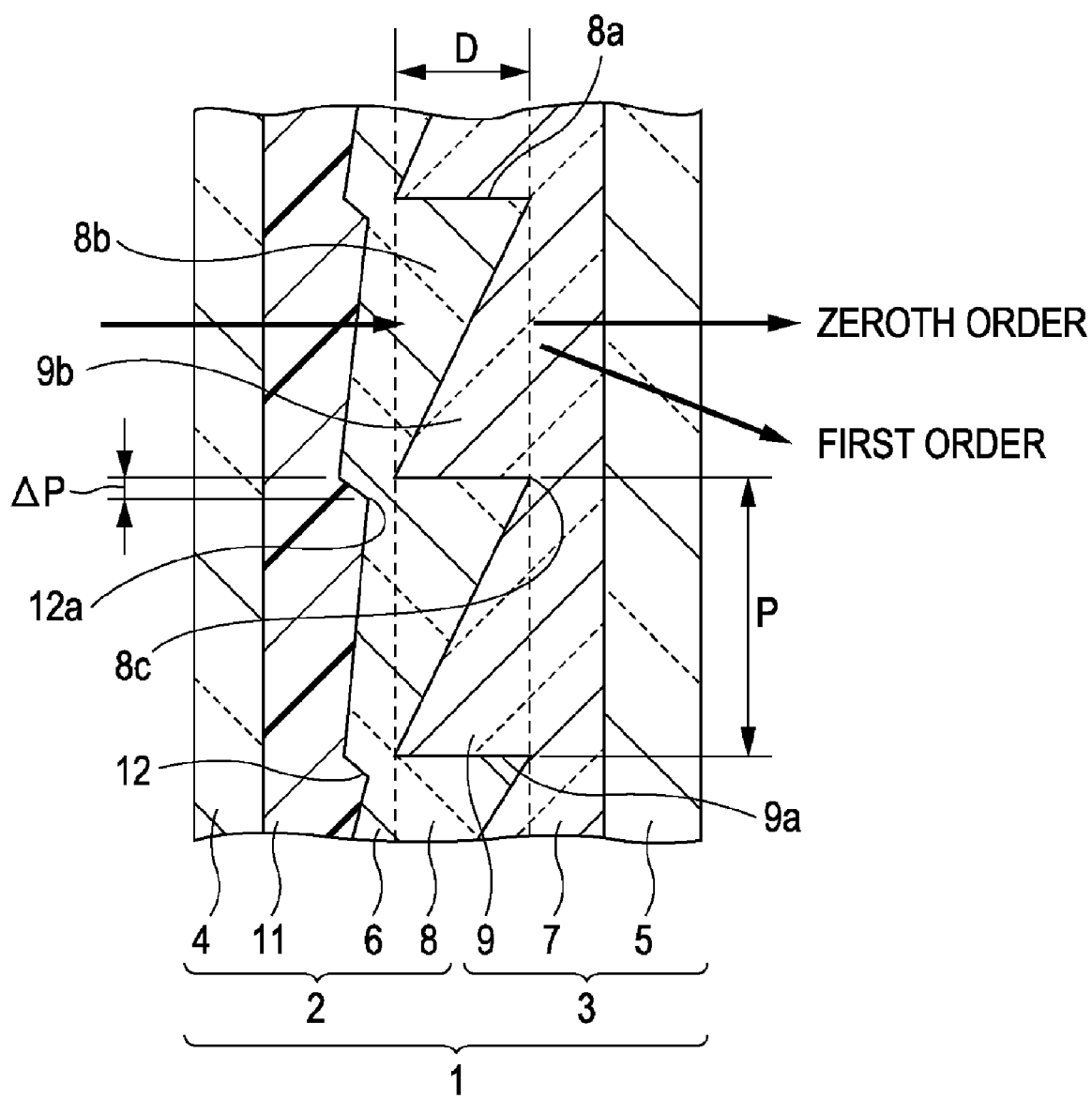
FIG. 6 is a partial sectional view of a diffractive optical element according to a third embodiment of the present invention.

FIG. 6 is a sectional view of the main portion of the third embodiment of the present invention.

In FIG. 6, a diffraction optical element is shown in a state in which, in a periodic structure 12 at an interface between an intermediate layer 11 and a base 6, formed of the same material as a diffraction grating 8, the position of a maximum height within an area thereof is displaced from the grating apices of grating surfaces 8a and 9a.

When the periodicity of the periodic structure 12 differs from the periodicities of actual diffraction gratings 8 and 9, a mismatching of the phases occurs, thereby making it difficult to correct the phase difference.

This mismatching of the phases becomes noticeable as the phase difference occurring due to the periodic structure 12 is increased, or as a displacement amount ΔP between the position of the maximum height of the periodic shape 12 and the grating apices of the grating surfaces 8a and 9a within the same period is increased.

Accordingly, the same materials as those in the second embodiment are used in the third embodiment. The grating thicknesses of grating portions 8b and 9b of the respective diffraction gratings 8 and 9 are 10.85 μm, and a maximum height dx of the periodic shape 12 is 0.5 μm.

Figure 7:
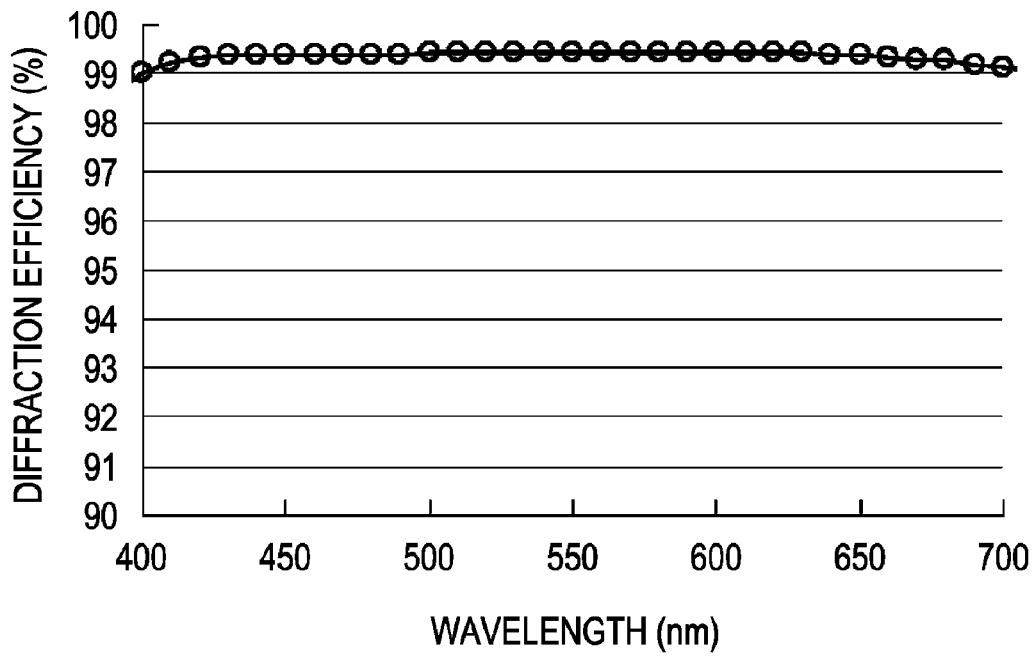
FIG. 7 is a characteristic diagram of diffraction efficiency for a design order of the diffractive optical element according to the third embodiment.

Further, the displacement amount ΔP is set at 10 μm. The diffraction efficiency at this time is shown in FIG. 7.

A high diffraction efficiency of at least 99% is obtained over the entire visible range.

Satisfying the following Conditional Expression (8) makes it possible to limit the change in the diffraction efficiency to a very small value even when the periodic structure 12 does not have a sawtooth form:

$$|dx \times \Delta N_d \times \Delta P|/(\lambda_d \times P) < 0.013 \quad (8)$$

Here, dx represents the maximum height (μm) of the periodic structure 12, and $\Delta N_d$ represents the difference between the refractive indices at a wavelength (d-line) (μm) of a material A of the diffraction grating 8 and a material B of the intermediate layer 11. ΔP represents the displacement amount (distance) (μm) in a grating pitch direction between a position 12a at the maximum height of the periodic shape 12 and a grating apex 8c of the grating surface 8a (9a) within the same-period structure.

P represents the pitch (μm) of the grating portion 8b (9b) of the diffraction grating 8 (9).

In the third embodiment, the value on the left side of Conditional Expression (8) is 0.005, so that the structure satisfies the condition of Conditional Expression (8).

Fourth Embodiment

Although, in the first to third embodiments, resin materials and materials in which fine particles are dispersed in the resin materials are used as the materials of the element portions of the diffractive optical element 1, the materials of the element portions of the diffractive optical element 1 according to the present invention are not limited thereto. For example, the diffractive optical element 1 may be produced using a glass mold material.

The sectional view of the main portion of the diffractive optical element 1 according to the fourth embodiment is the same as FIG. 4. In the fourth embodiment, a diffractive optical element having predetermined optical characteristics is provided using materials differing from those of the element portions in the second embodiment.

In the fourth embodiment, in the diffractive optical element 1 shown in FIG. 4, polycarbonate (hereunder referred to as "PC") (Nd=1.58, vd=30.5) (manufactured by Teijin Chemicals Ltd.) is used as the base material of the material of a grating portion 8b of a first diffraction grating 8. For the diffraction grating 8, a material (Nd=1.617, vd=18.9) in which ITO fine particles are mixed with the base material at a volume ratio of 13.5% is used.

A thickness da of a base 6, formed of the same material as the diffraction grating 8, is 5 μm.

Further, an intermediate layer (material layer) 11, formed of ultraviolet curable resin (Nd=1.522, vd=51.3), manufactured by Dainippon Ink & Chemicals, Inc., is formed between the diffraction grating 8 and a substrate 4 so as to have a thickness of 20 μm.

Here, a periodic structure 12 having a maximum height of 0.4 μm is formed between the intermediate layer 11 and the diffraction grating 8.

In a grating portion 9b of a second diffraction grating 9, a glass mold material VC80 (Nd=1.694, vd=53.1), manufactured by Sumita Optical Glass, Inc., is used. The grating thicknesses of the grating portions 8b and 9b of the respective diffraction gratings 8 and 9 are both 7.10 μm.

Figure 8:
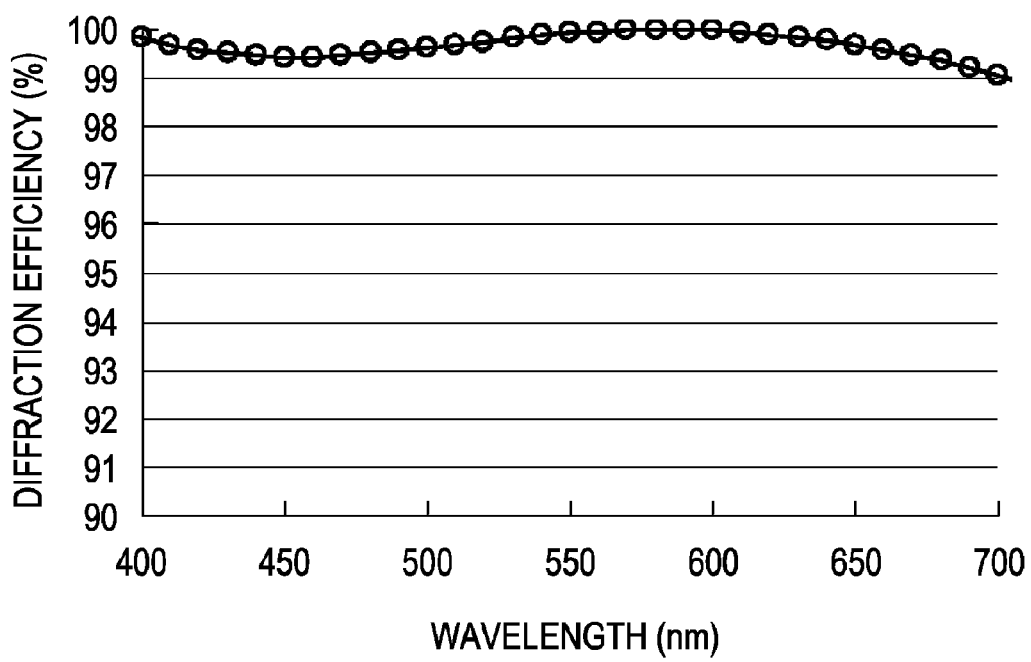
FIG. 8 is a characteristic diagram of diffraction efficiency for a design order of a diffractive optical element according to a fourth embodiment.

Diffraction efficiency characteristics at this time are shown in FIG. 8. A high diffraction efficiency of at least 99% is achieved over the entire visible range.

The extinction coefficient for the d-line of ITO fine particle diffusion material used in the fourth embodiment is $4.37 \times 10^{-4}$, and the extinction coefficient for the d-line of the material of the intermediate layer 11 is $7.35 \times 10^{-6}$. The transmittance of the entire diffractive optical element 1 is 92%.

In the fourth embodiment, the value on the left side of Conditional Expression (2) is 0.07, and the values of Conditional Expressions (7a) and (7b) are 1.3 and 0.9, respectively.

Fifth Embodiment

In the diffractive optical elements according to the first to fourth embodiments, the first and second diffraction gratings are adhered to each other. The diffractive optical element according to the present invention is not limited thereto. A diffractive optical element according to a fifth embodiment has a structure in which, for example, first and second diffraction gratings oppose each other with an air layer being provided therebetween.

Figure 9:
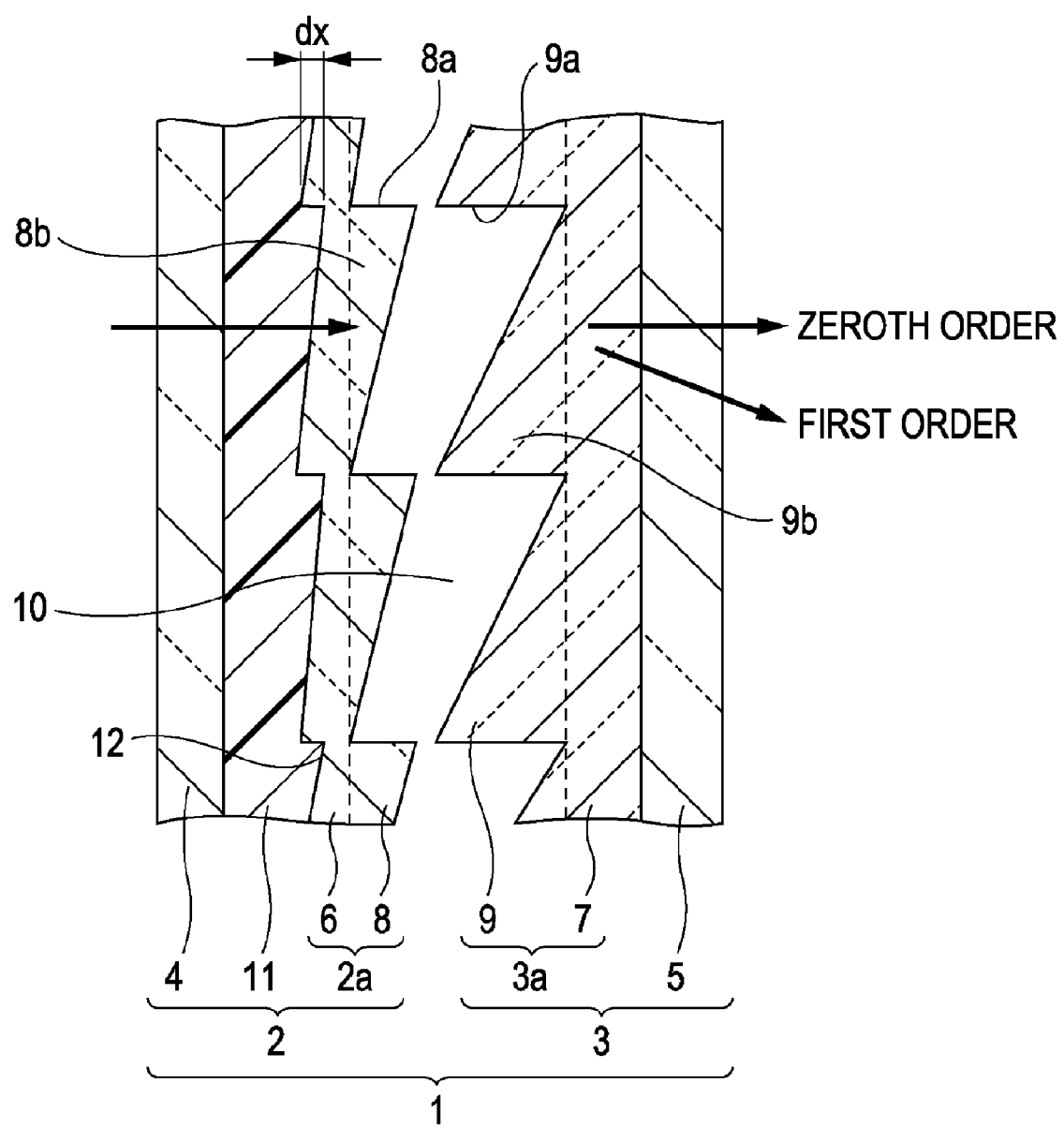
FIG. 9 is a partial sectional view of a diffractive optical element according to a fifth embodiment of the present invention.

FIG. 9 is a sectional view of the main portion of the fifth embodiment according to the present invention.

A diffractive optical element 1 comprises a first element portion 2 and a second element portion 3, and is formed so that a first diffraction grating 8 and a second diffraction grating 9 oppose each other with an air layer 10 being provided therebetween. The first element portion 2, the second element portion 3, and the air layer 10 as a whole function as one diffractive optical element 1.

The first diffraction grating 8 and the second diffraction grating 9 have concentric grating shapes, and function as lenses as a result of changing a grating pitch of grating portions 8b and 9b in a radial direction. The grating portions 8b and 9b of the respective first and second diffraction gratings 8 and 9 have the same or substantially the same grating pitch distribution.

As shown in FIG. 9, the first element portion 2 comprises a first grating formation layer 2a including a grating base 6 and a first diffraction grating 8. The first diffraction grating 8 is integrally formed with the grating base 6. The grating portion 8b of the first diffraction grating 8 has a grating surface 8a at a boundary between the grating portion 8b of the first diffraction grating 8 and the air layer 10.

Further, the first element portion 2 comprises a first transparent substrate 4 and an intermediate layer 11. The first transparent substrate 4 is formed of, for example, a lens or a flat plate. The intermediate layer 11 is formed of a material that has good transparency and is disposed between the first transparent substrate 4 and the base 6. An interface between the intermediate layer 11 and the base 6 has a periodic shape 12 having substantially the same period as a grating period of the grating portion 8b of the diffraction grating 8.

Similarly to the first element portion 2, the second element portion comprises a second transparent substrate 5 and a second grating formation layer 3a. The second transparent substrate 5 is formed of, for example, a lens or a flat plate. The second grating formation layer 3a includes a grating base 7, formed on the second transparent substrate 5, and a second diffraction grating 9, integrally formed with the grating base 7. The grating portion 9b of the second diffraction grating 9 has a grating surface 9a at a boundary between the grating portion 9b of the second diffraction grating 9 and the air layer 10.

In the base 6 and the grating portion 8b of the first diffraction grating 8, ultraviolet curable resin (Nd=1.522, vd=51.3), manufactured by Dainippon Ink & Chemicals, Inc., is used as a base material. For the diffraction grating 8, a material ($n_d$=1.570, vd=21.9) in which ITO fine particles are mixed with the base material at a volume ratio of 14% is used. The grating thickness of the grating portion 8b is 11.10 μm.

Here, the thickness of the base 6, formed of the same material as the grating portion 8b of the diffraction grating 8, is 2.5 μm.

The intermediate layer 11, disposed between the base 6 and the substrate 4, is formed of ultraviolet curable resin (Nd=1.522, vd=51.3), manufactured by Dainippon Ink & Chemicals, Inc. The thickness of the intermediate layer 11 is 10 μm.

Here, the periodic structure 12 having substantially the same period as the grating portion 8b of the diffraction grating 8 is formed between the base 6 and the intermediate layer 11, and has a maximum height of 0.7 μm.

The base 7 and the grating portion 9b of the second diffraction grating 9 are formed of ultraviolet curable resin ($n_d$=1.522, vd=51.3), manufactured by Dainippon Ink & Chemicals, Inc. The thickness of the grating portion 9b is 13.14 μm.

Figure 10:
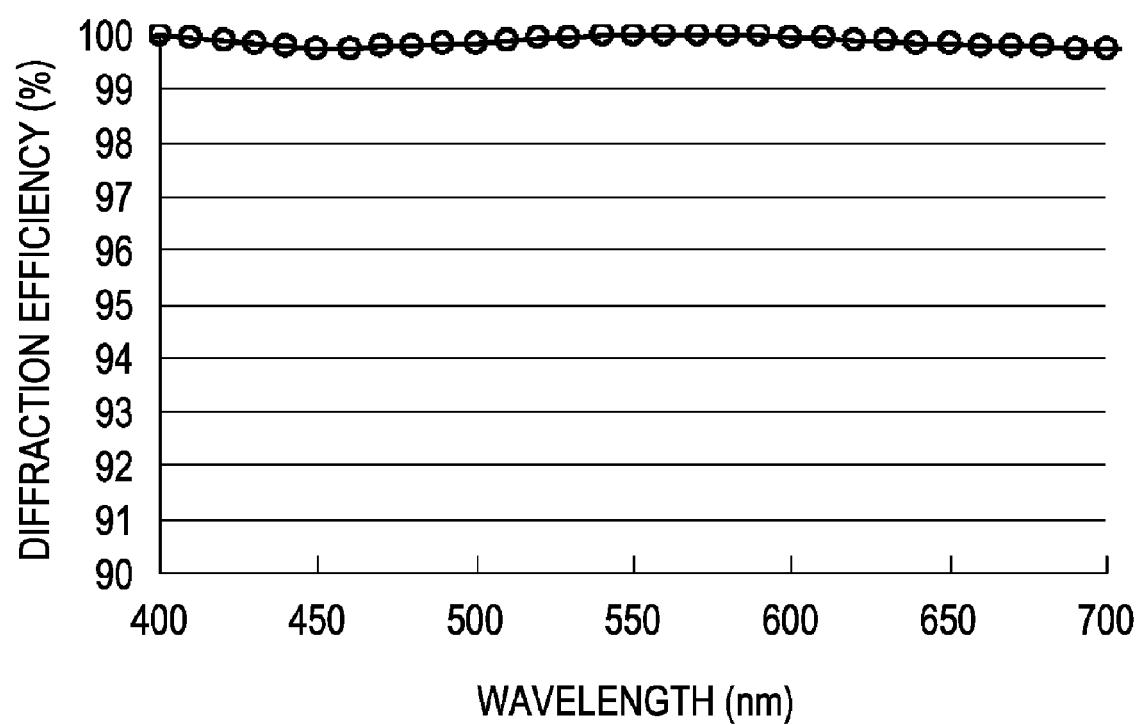
FIG. 10 is a characteristic diagram of diffraction efficiency for a design order of the diffractive optical element according to the fifth embodiment.

Diffraction efficiency characteristics at this time are shown in FIG. 10.

As shown in FIG. 10, a high diffraction efficiency of at least 99% is achieved over the entire visible range.

The extinction coefficient for the d-line of ITO fine particle diffusion material used in the fifth embodiment is $5.51 \times 10^{-4}$, and the extinction coefficient for the d-line of the material of the intermediate layer 11 is $7.35 \times 10^{-6}$. The transmittance of the entire diffractive optical element 1 is 90%.

In the fifth embodiment, the value on the left side of Conditional Expression (2) is 0.09, and the values of Conditional Expressions (7a) and (7b) are 1.2 and 0.9, respectively.

As mentioned above, in the diffractive optical element according to each of the embodiments of the present invention, the intermediate layer 11 is only provided between the substrate 4 and the base 6 at the first diffraction grating 8. The diffractive optical element according to the present invention is not limited thereto. For example, an intermediate layer may be provided between the substrate 5 and the base 7 at the second diffraction grating 9, or intermediate layers may be provided between the substrate 4 and the base 6 and between the substrate 5 and the base 7, respectively. Alternatively, when a plurality of diffraction gratings are used, a plurality of intermediate layers may be provided, in which case similar effects are provided.

Next, a specific method of producing the diffractive optical element according to the present invention will be described. Here, the method will be described taking as an example, a method of producing the first element portion 2 of the diffractive optical element 1 according to the fifth embodiment shown in FIG. 9.

FIGS. 11A to 11G are sequential schematic views of a method of producing the first element portion 2 of the diffractive optical element according to the fifth embodiment of the present invention.

The method according to the embodiment includes the following two steps.

First Step

A material A (51), including first light energy curable resin, is squeezed in a mold 52, where a diffraction surface of a periodic structure is formed. Alternatively, the material A (51) is molded with a flat mold to flatten an interface. Then, a change in shape is concentrated at a free-surface side of the material A that is not in contact with the mold 52, and a periodic structure is formed for hardening the material A.

Second Step

A material B (57), including second light energy curable resin having an extinction coefficient that is smaller than that of the material A, is molded at the free-surface side of the hardened material A by a replica molding method.

Illustrated Sequential Description

The method of producing the diffractive optical element according to the embodiment will be sequentially described in order with reference to FIGS. 11A to 11G.

In FIGS. 11A to 11G, reference numeral 51 denotes energy curable resin prior to curing and used for forming a diffraction grating 8. Reference numeral 52 denotes a mold for forming a functional surface of a resin surface. Reference numeral 53 denotes a spatular member for flattening and making uniform the dropped resin 51. The spatular member 53 moves above the mold by a mechanism (not shown).

Reference numeral 54 denotes ultraviolet light. Reference numeral 55 denotes a first resin (corresponding to the first diffraction grating 8) resulting from hardening the resin 51 by irradiating it with the ultraviolet light 54. Reference numeral 56 denotes a periodic shape (corresponding to the periodic structure 12) produced by curing the first resin 55. Reference numeral 57 denotes light energy curable resin (second resin) which has an extinction coefficient that is lower than that of the material A, which has good transparency, and which is used to form an intermediate layer 11 on the first resin 55. Reference numeral 58 denotes a glass substrate (corresponding to the substrate 4).

Reference numeral 61 denotes resin (corresponding to the intermediate layer 11) resulting from hardening the resin 57. Reference numeral 62 denotes a first element portion (corresponding to the first element portion 2) in which the resin (55, 61) is integrally formed with the glass substrate 58.

Figure 11A:
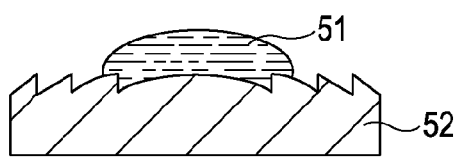
FIGS. 11A to 11G illustrate a method of producing a diffractive optical element according to the present invention.
Figure 11B:
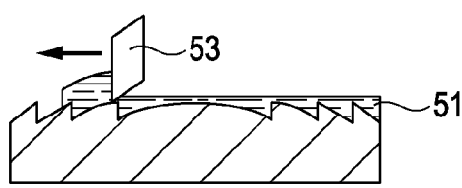

First, a predetermined amount of liquid light-energy curable resin 51 is dropped on the mold 52 (see FIG. 11A). On the surface of the mold 52, fine sawtooth forms are concentrically formed for achieving a predetermined diffraction condition.

The resin 51 is flattened and made uniform with the spatular member 53. The spatular member 53 is moved above the mold while it is at a height of 2.5 μm from an apex of the sawtooth mold 52. Accordingly, the thickness of the resin of the base 6 is made uniform at 2.5 μm (see FIG. 11B).

Figure 11C:
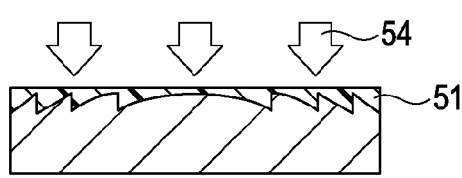
Figure 11D:
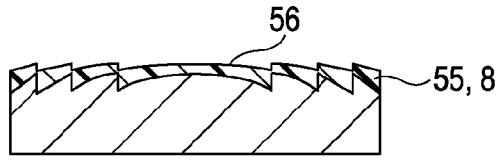

By irradiating the flattened resin 51 with the ultraviolet light 54, the resin 51 is cured (see FIG. 11C). The periodic shape 56 having a maximum height of 0.7 μm is formed at the interface between the resin 51 and an air layer at this time (see FIG. 11D).

Figure 11E:
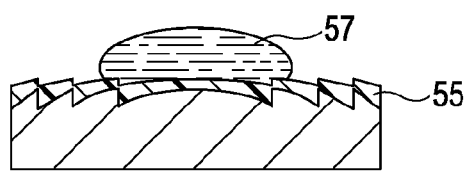

A predetermined amount of second resin 57 is dropped on the second resin 57 (see FIG. 11E).

Thereabove, a contact surface (which contacts the resin 57) of the glass substrate 58 having smooth surfaces comes into contact with the resin 57. The glass substrate 58 is held at a height that is 10 μm from an apex of a sawtooth (see FIG. 11F).

Figure 11F:
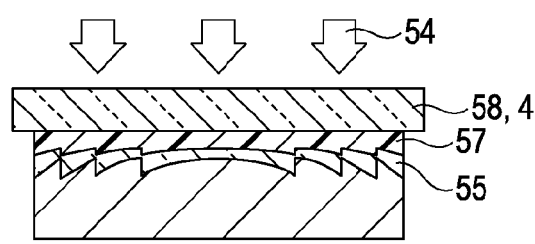
Figure 11G:
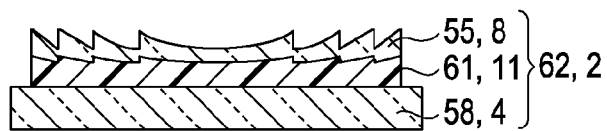

By performing irradiation past the glass substrate 58 with the ultraviolet light 54 in this state, the second resin 57 is cured to form the intermediate layer 61 (see FIG. 11F).

Thereafter, the cured resins 55 and 61 are separated from the mold 52 using, for example, an ejector, to form the first element portion 62 in which the cured first and second resins 55 and 61 are integrally formed with the glass substrate 58.

According to this method, stress load or distortion occurring due to curing and contraction during the molding of the first diffraction grating 8 (55) can be concentrated at the interface, so that, for example, distortion and peeling during the molding can be reduced.

In addition, internal stress of the first diffraction grating 8 after the molding can be reduced, so that a diffractive optical element that can withstand environmental changes can be produced.

Further, by forming the first element portion 2 of the diffractive optical element by the replica molding method using materials satisfying the aforementioned Conditional Expressions (2), (7a), (7b), and (8), a diffractive optical element having a high diffraction efficiency can be produced even by the above-described producing method.

Figure 12:
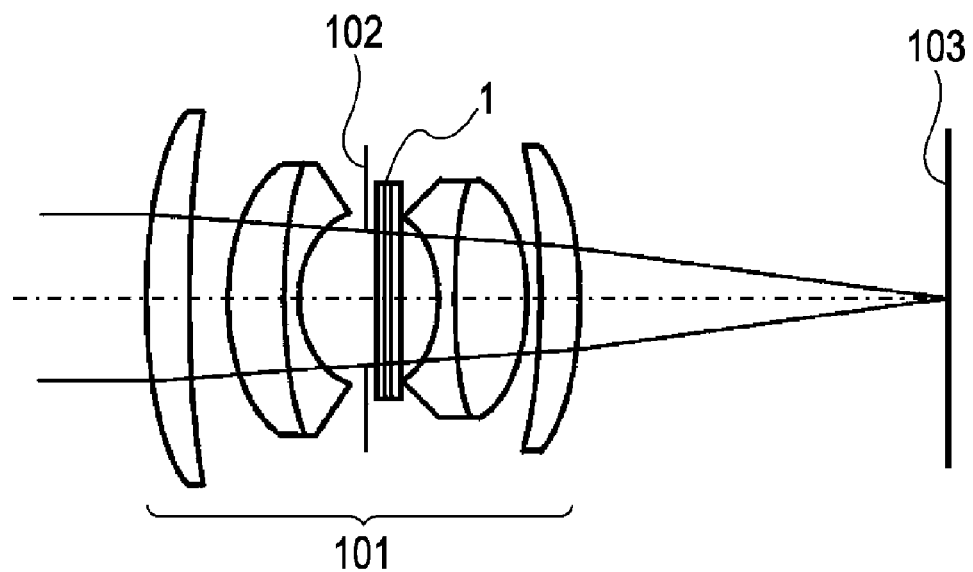
FIG. 12 shows the structure of an image-forming optical system using the diffractive optical element according to the present invention.

FIG. 12 is a sectional view of lenses of an image-forming optical system of a camera (such as a still camera or a video camera) using the diffractive optical element according to the present invention.

In FIG. 12, reference numeral 101 denotes an image-forming lens comprising in large part a refractive optical element (such as an ordinary lens element). The image-forming lens 101 internally comprises an aperture stop 102 and the diffractive optical element 1 that is discussed in any one of the embodiments.

Reference numeral 103 denotes an image-forming medium, such as a film or a CCD sensor, disposed in an image-forming plane. The diffractive optical element 1 functions as a lens, and corrects chromatic aberration occurring at the refractive optical element in the image-forming lens 101. The diffraction efficiency characteristics of the diffractive optical element 1 are considerably improved.

Therefore, in the embodiment, an image-forming optical system having little flare, having a high resolution at low frequency, and having high optical performance is achieved.

Although, in the embodiment, the diffractive optical element 1 having a flat glass as a substrate near the aperture stop 102 is provided, the embodiment is not limited thereto. For example, the diffractive optical element 1 may have a structure in which the substrate is a lens and the diffraction grating is provided at either the concave or convex surface of the lens. A plurality of diffractive optical elements 1 may be disposed in the image-forming lens 101.

Figure 13:
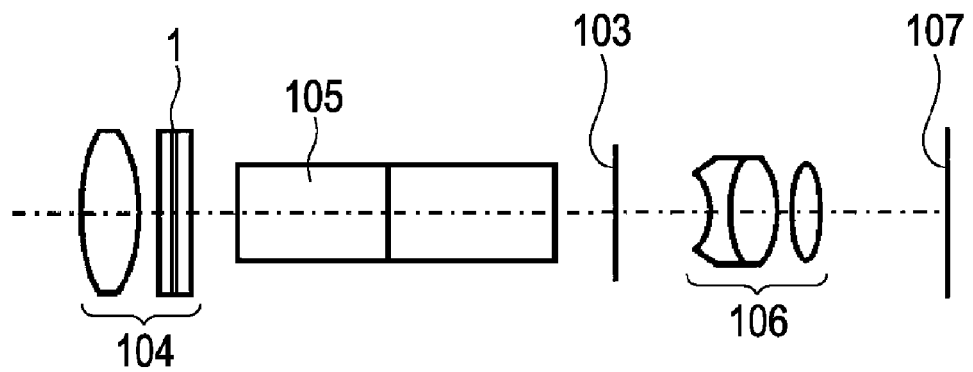
FIG. 13 shows the structure of an image-forming optical system using the diffractive optical element according to the present invention.

FIG. 13 is a sectional view of lenses of an observation optical system of, for example, a telescope or a microscope, using the diffractive optical element according to the present invention.

In FIG. 13, reference numeral 104 denotes an objective lens. Reference numeral 105 denotes a prism (image reversing unit) for setting upright an inverted image. Reference numeral 106 denotes an eyepiece. Reference numeral 107 denotes an evaluation plane (pupil plane). Reference numeral 1 denotes the diffractive optical element that is discussed in any one of the embodiments, and that corrects, for example, chromatic aberration at an image-forming plane 103 of the objective lens 104.

Diffraction efficiency characteristics of the observation optical system shown in FIG. 13 are considerably improved. Therefore, the observation optical system has little flare, a high resolution at a low frequency, and has a high optical performance.

Although, in the embodiment, the diffractive optical element 1 using a flat glass as the substrate is used, the present invention is not limited thereto. For example, in the diffractive optical element 1, the substrate may be a lens, and a diffraction grating may be provided at a convex surface or a convex surface thereof. In addition, a plurality of diffractive optical elements 1 may be disposed in the observation optical system.

Although, in the embodiment, the diffractive optical element 1 is provided at the objective lens 104, the present invention is not limited thereto. For example, the diffractive optical element 1 may be provided at a surface of the prism 105 or within the eyepiece 106. Even in such a case, similar effects are provided.

However, when the diffractive optical element 1 is disposed closer to an object side than the image-forming plane 103, chromatic aberration is reduced by only the objective lens 104. Therefore, when a macroscopic observation system is used, it is desirable to provide a diffractive optical element at least at the objective lens 104.

Although, in the embodiment, the observation optical system of a binocular is discussed, the diffractive optical element according to the present invention can also be applied to an observation optical system of, for example, a terrestrial telescope or an astronomical telescope. Further, the diffractive optical element according to the present invention is also applicable to an optical finder of, for example, a video camera or a lens shutter camera. In these cases, similar effects as those previously discussed are provided.

Figure 14:
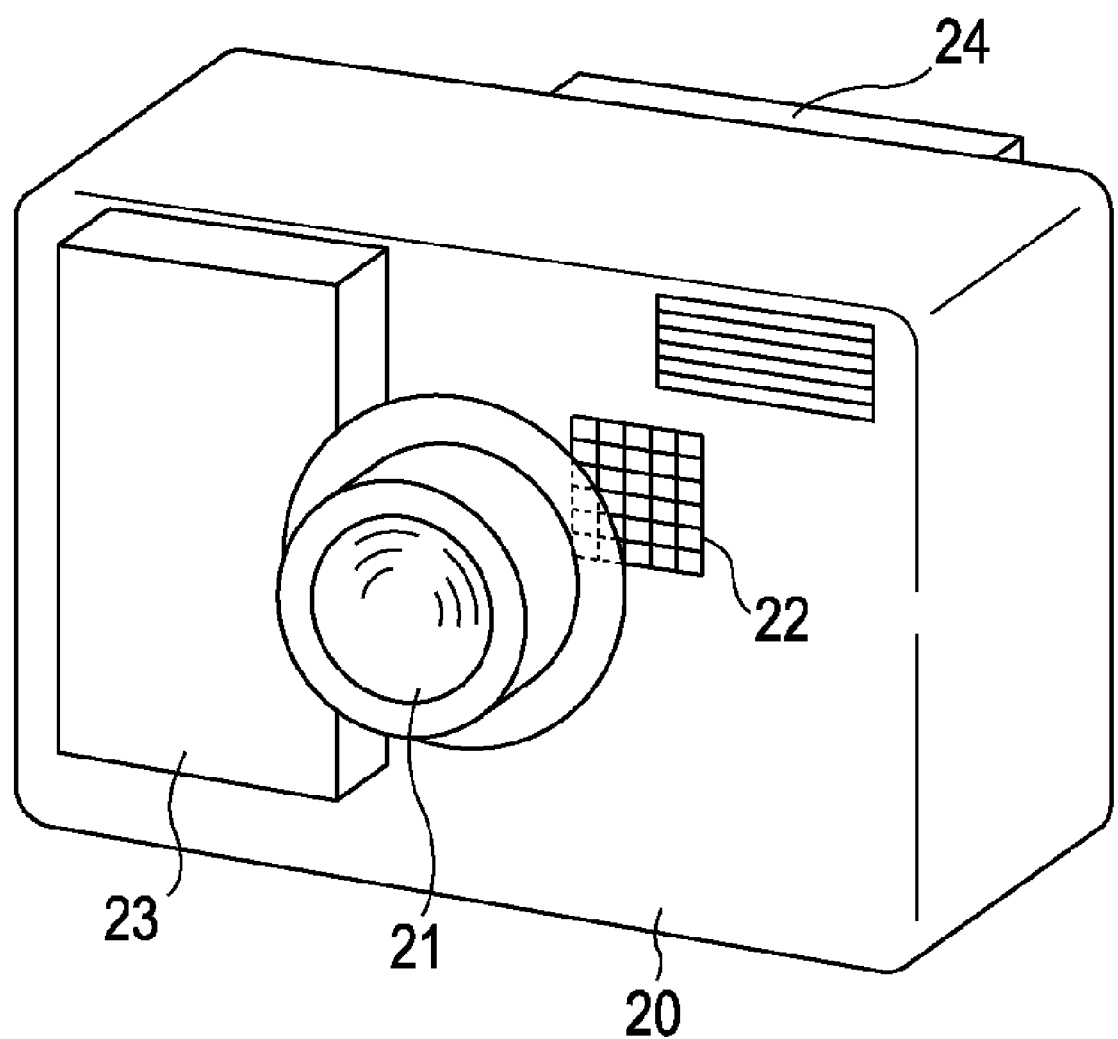
FIG. 14 is a schematic view of the main portion of an image pickup apparatus according to the present invention.

FIG. 14 is a schematic view of the main portion of a digital still camera (image pickup apparatus) in which an optical system including the diffractive optical element according to the present invention is used as an image-forming optical system.

Reference numeral 20 denotes a camera body. Reference numeral 21 denotes an image-forming optical system including a diffractive optical element. Reference numeral 22 denotes a solid-state image pickup element (photoelectric conversion element) of, for example, a CCD sensor or a CMOS sensor. The solid-state image pickup element 22 is incorporated in the camera body 20 and receives an object image formed by the image-forming optical system 21.

Reference numeral 23 denotes a memory for recording information corresponding to the object image subjected to photoelectric conversion by the image pickup element 22. Reference numeral 24 denotes a finder comprising, for example, a liquid crystal display panel, and used for observing the object image formed on the solid-state image pickup element 22.

Accordingly, when an optical system including a diffractive optical element is applied to an image pickup optical system, (for example, a digital still camera), an image pickup apparatus having little flare, having sufficient transparency, and having a high optical performance is realized.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-312144 filed Dec. 3, 2007, which is hereby incorporated by reference herein in its entirety.

What is claimed is:

1. A diffractive optical element comprising:
   at least one element portion including a base, a diffraction grating, a substrate, and an intermediate layer, the base and the diffraction grating disposed above the substrate through the intermediate layer,
   wherein the base and the diffraction grating are formed of a same material, and
   wherein the following conditional expressions are satisfied:

$3.0 \times 10^{-4} < Ka < 1.0 \times 10^{-3}$, and $Kb < 3.0 \times 10^{-4}$ where Ka and Kb are an extinction coefficient for the d-line of the material of the diffraction grating and an extinction coefficient for the d-line of a material of the intermediate layer respectively.

2. The diffractive optical element according to claim 1, wherein the diffraction grating includes a sawtooth grating portion,
   wherein a sawtooth periodic structure is provided at an interface between the intermediate layer and the base, has a period that is the same as a grating period of the diffraction grating, and has a grating section, and
   wherein the following conditional expression is satisfied:

$|dx \times \Delta N_d|/\lambda_d < 0.2$ where dx is a grating height of the grating section of the sawtooth periodic structure within any period, and $\Delta N_d$ is a difference between refractive indices at a wavelength $\lambda_d$ of the d-line of the material of the diffraction grating and the d-line of the material of the intermediate layer.

3. The diffractive optical element according to claim 2, wherein the following conditional expressions are satisfied:

$0.4 < |\Delta N_g/\Delta N_d| < 1.5$, and $0.6 < |\Delta N_C/\Delta N_d| < 2.2$ where $\Delta N_g$ is a difference between refractive indices for the g-line of the material of the diffraction grating and the g-line of the material of the intermediate layer, $\Delta N_d$ is a difference between the refractive indices for the d-line of the material of the diffraction grating and the d-line of the material of the intermediate layer, and $\Delta N_C$ is a difference between refractive indices for the C-line of the material of the diffraction grating and the C-line of the material of the intermediate layer.

4. The diffractive optical element according to claim 1, wherein the diffraction grating includes a sawtooth grating portion,
   wherein a sawtooth periodic structure is provided at an interface between the intermediate layer and the base, has a period that is the same as a grating period of the diffraction grating, and has a grating section, and
   wherein the following conditional expression is satisfied:

$|dx \times \Delta N_d \times \Delta P|/(\lambda_d \times P) < 0.013$ where dx is the grating height of the grating section of the sawtooth periodic structure within any period, $\Delta N_d$ is a difference between refractive indices at a wavelength $\lambda_d$ of the d-line of the material of the diffraction grating and the d-line of the material of the intermediate layer, P is a grating pitch of the diffraction grating, and $\Delta P$ is a distance in a grating pitch direction between a position of a maximum height of the grating section of the sawtooth periodic structure and a grating apex of the sawtooth grating portion of the diffraction grating within the same period.

5. The diffractive optical element according to claim 1, wherein the diffraction grating includes a sawtooth grating portion,
   wherein a sawtooth periodic structure is provided at an interface between the intermediate layer and the base, has a period that is the same as a grating period of the diffraction grating, and has a grating section, and
   wherein the grating section of the sawtooth periodic structure is oriented so that directions in which heights of the grating section and the sawtooth grating portion of the diffraction grating are increased and decreased are the same.

6. The diffractive optical element according to claim 1, wherein the following conditional expression is satisfied:

$(Da-D) < 8(\mu m)$ where D ($\mu$m) is a maximum grating thickness of the grating portion of the diffraction grating, and Da ($\mu$m) is a sum of the maximum grating thickness of the grating portion and a maximum grating thickness of the base.

7. The diffractive optical element according to claim 1, wherein the following conditional expression is satisfied:

$10(\mu m) \leq Db$ where Db ($\mu$m) is a thickness of the intermediate layer.

8. The diffractive optical element according to claim 1, wherein the material of the diffraction grating is one in which a fine-particle material is mixed with a resin material.

9. The diffractive optical element according to claim 8, wherein an average particle diameter of the fine-particle material is less than or equal to 1/20 of 590 nm.

10. The diffractive optical element according to claim 8, wherein the fine-particle material is indium tin oxide.

11. The diffractive optical element according to claim 8, wherein the resin material is ultraviolet curable resin.

12. An optical system comprising:
    a refractive optical element; and
    the diffractive optical element of claim 1.

13. An optical apparatus comprising:
    the optical system according to claim 12; and
    a photoelectric conversion element that receives an image that is formed by the optical system.

* * * * *